US011961258B2

(12) United States Patent
Ma (10) Patent No.: US 11,961,258 B2
(45) Date of Patent: Apr. 16, 2024

(54) CALIBRATION METHOD FOR OPTICAL SEE-THROUGH DISPLAY AND CALIBRATION SYSTEM

(71) Applicant: Industrial Technology Research Institute, Hsinchu (TW)

(72) Inventor: Tien-Yan Ma, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 18/156,387

(22) Filed: Jan. 19, 2023

(65) Prior Publication Data

US 2023/0237703 A1 Jul. 27, 2023

Related U.S. Application Data

(60) Provisional application No. 63/303,464, filed on Jan. 26, 2022.

(30) Foreign Application Priority Data

Nov. 16, 2022 (TW) .................................. 111143809

(51) Int. Cl.
*G06T 7/80* (2017.01)
*G02B 27/01* (2006.01)
(Continued)

(52) U.S. Cl.
CPC .................. *G06T 7/80* (2017.01); *G06T 7/33* (2017.01); *G06T 7/70* (2017.01); *G02B 27/0093* (2013.01);
(Continued)

(58) Field of Classification Search
CPC .... G06T 7/80; G06T 7/33; G06T 7/70; G06T 19/006; G06T 2207/20076;
(Continued)

(56) References Cited

U.S. PATENT DOCUMENTS 7,193,584 B2 3/2007 Lee
9,213,163 B2 12/2015 Lewis et al.
(Continued)

FOREIGN PATENT DOCUMENTS

CN 102928979 3/2016
CN 110880188 3/2020
(Continued)

OTHER PUBLICATIONS

Cutolo, Off-Line Camera-Based Calibration for Optical See-Through Head-Mounted Displays, Dec. 25, 2019, Applied Sceinces, 2020, 10,193 (Year: 2019).*

(Continued)

*Primary Examiner* — Douglas M Wilson (74) *Attorney, Agent, or Firm* — JCIPRNET (57) ABSTRACT

A calibration method for an optical see-through display includes the following. An image sensing device is fixed at a standard position of an eye of a user seeing the optical see-through display, and the image sensing device is configured to photograph a virtual image displayed by the optical see-through display and an image of a real object in an environment. Extrinsic parameters between the image sensing device and a virtual camera are calculated by using extrinsic parameters between the image sensing device and multiple calibration patterns of the real object as well as extrinsic parameters between the virtual camera and the multiple calibration patterns of the real object. A calibration system is also provided.

18 Claims, 6 Drawing Sheets

(51) Int. Cl.
*G06T 7/33* (2017.01)
*G06T 7/37* (2017.01)
*G06T 7/70* (2017.01)
*G06T 19/00* (2011.01)
*H04N 13/327* (2018.01)
*G02B 27/00* (2006.01)
*H04N 13/332* (2018.01)

(52) U.S. Cl.
CPC .. *G02B 27/0179* (2013.01); *G02B 2027/0181* (2013.01); *G05B 2219/37009* (2013.01); *G06T 7/337* (2017.01); *G06T 7/37* (2017.01); *G06T 19/006* (2013.01); *G06T 2207/20076* (2013.01); *G06T 2207/30208* (2013.01); *G09G 2320/0693* (2013.01); *H04N 13/327* (2018.05); *H04N 13/332* (2018.05)

(58) Field of Classification Search
CPC . G06T 2207/30208; G06T 7/337; G06T 7/37; G02B 2027/0181; G02B 27/0093; G02B 27/0179; H04N 13/327; H04N 13/332; G05B 2219/37009; G09G 2320/0693
See application file for complete search history.

(56) References Cited

U.S. PATENT DOCUMENTS

| | | | |
|---|---|---|---|
| 9,678,344 | B2 | 6/2017 | Takeda et al. |
| 10,073,518 | B2 | 9/2018 | Rahman et al. |
| 10,198,865 | B2 * | 2/2019 | Kezele ................ G02B 30/34 |
| 10,368,059 | B2 | 7/2019 | Fateh et al. |
| 10,506,220 | B2 | 12/2019 | Danziger |
| 10,798,370 | B2 | 10/2020 | Zhang et al. |
| 10,869,024 | B2 | 12/2020 | Danziger |
| 10,890,767 | B1 | 1/2021 | Fernandez |
| 10,925,484 | B2 | 2/2021 | Aferzon et al. |
| 11,176,706 | B2 * | 11/2021 | Javan Roshtkhari .. G03B 43/00 |
| 11,223,820 | B2 | 1/2022 | Danziger |
| 11,482,141 | B1 * | 10/2022 | Wells ................... G09G 3/002 |
| 2016/0012643 | A1 | 1/2016 | Kezele et al. |
| 2021/0099691 | A1 | 4/2021 | Danziger |
| 2021/0142508 | A1 * | 5/2021 | Azimi ................ G02B 27/017 |

FOREIGN PATENT DOCUMENTS

| | | |
|---|---|---|
| CN | 109040738 | 8/2020 |
| CN | 111544115 | 8/2020 |
| CN | 108235778 | 9/2021 |
| CN | 110915210 | 10/2021 |
| CN | 111226156 | 5/2022 |
| JP | 2015141418 | 8/2015 |
| TW | 201421071 | 6/2014 |
| TW | 591378 | 7/2017 |
| TW | 201901215 | 1/2019 |
| TW | 201932914 | 8/2019 |
| TW | 202212909 | 4/2022 |
| TW | 202217399 | 5/2022 |

OTHER PUBLICATIONS

Zhang, A flexible New technique for Camera Calibration, Nov. 2000, IEEE Transactions on Pattern Analysis and Machine Intelligence, vol. 22, No. 11 (Year: 2000).*

Camera Calibration, https://docs.opencv.org, tutorial_py_calibration, Nov. 11, 2021 (Year: 2021).*

Fabrizio Cutolo et al., "Off-Line Camera-Based Calibration for Optical See-Through Head-Mounted Displays", Applied Sciences, Dec. 25, 2019, pp. 1-19.

Umberto Fontana et al., "Closed-Loop Calibration for Optical See-Through Near Eye Display with Infinity Focus", 2018 IEEE International Symposium on Mixed and Augmented Reality Adjunct (ISMAR-Adjunct), Oct. 16-20, 2018, pp. 51-56.

Vincenzo Ferrari et al., "Parallax Free Registration for Augmented Reality Optical See-through Displays in the Peripersonal Space", IEEE Transactions On Visualization and Computer Graphics, vol. 28, No. 3, Mar. 2022, pp. 1608-1618.

Xue Hu et al., "Alignment-free Offline Calibration of Commercial Optical See-Through Head-Mounted Displays with Simplified Procedures", IEEE Access, Dec. 11, 2020, pp. 1-15.

Xue Hu et al., "Rotation-constrained optical see-through headset calibration with bare-hand alignment", 2021 IEEE International Symposium on Mixed and Augmented Reality (ISMAR), Oct. 4-8, 2021, pp. 256-264.

"Office Action of Taiwan Counterpart Application", dated Jul. 19, 2023, p. 1-p. 7.

* cited by examiner

CALIBRATION METHOD FOR OPTICAL SEE-THROUGH DISPLAY AND CALIBRATION SYSTEM

CROSS-REFERENCE TO RELATED APPLICATION

This application claims the priority benefits of U.S. provisional application Ser. No. 63/303,464, filed on Jan. 26, 2022 and Taiwan application serial no. 111143809, filed on Nov. 16, 2022. The entirety of each of the above-mentioned patent applications is hereby incorporated by reference herein and made a part of this specification.

TECHNICAL FIELD

The disclosure relates to a calibration method for a display and a calibration system, and particularly relates to a calibration method for an optical see-through display and a calibration system.

BACKGROUND

Augmented reality (AR) or mixed reality (MR) glasses project virtual images generated by computing units in fields of view of users by optical see-through displays, and users could see virtual images and environments of real objects at the same time to achieve a visual experience of the mixed reality. However, all optical elements on glasses are subject to manufacturing and assembly errors. In order to achieve an accurate effect of a fusion of virtual images and real objects, all AR or MR glasses need to pass through calibration procedures before leaving the factory to generate relevant parameters, which are provided to the computing units to generate optimized virtual images.

Most of the AR or MR glasses in the past did not take into account individual differences in eye distances of the users (i.e., interpupillary distances). During the calibration procedures, a predefined standard eye distance was used to calibrate relative spatial relationships between eyeballs and the displays. When the eye distance of the user differs from the standard eye distance defined by a manufacturer, the accuracy of the fusion of the virtual images and the real objects is affected.

SUMMARY

An embodiment of the disclosure provides a calibration method for an optical see-through display, which includes the following. An image sensing device is fixed at a standard position of an eye of a user seeing the optical see-through display, and the image sensing device is configured to photograph a virtual image displayed by the optical see-through display and an image of a real object in an environment. A virtual calibration pattern displayed by the optical see-through display is photographed by using the image sensing device, and a coordinate value of an image of multiple first feature points of the virtual calibration pattern is obtained. A projection homography matrix for transforming an image plane of the image sensing device to an image plane of the optical see-through display is calculated by using the coordinate values of the image of the multiple first feature points and coordinate values of the first feature points of the virtual calibration pattern. The optical see-through display is turned off; and multiple images of a calibration pattern of a real object are photographed at different angles by using the image sensing device, and the calibration pattern of the real object has multiple second feature points. Intrinsic parameters of the image sensing device as well as extrinsic parameters between the image sensing device and multiple calibration patterns of the real object are calculated by using coordinates of the multiple second feature points in the multiple images of the calibration pattern of the real object and the multiple second feature points on the calibration pattern of the real object. The coordinates of the multiple second feature points in the multiple images of the calibration pattern of the real object are transformed to coordinates of projection points of the image plane of the optical see-through display by using the projection homography matrix. Intrinsic parameters of a virtual camera of the optical see-through display as well as extrinsic parameters between the virtual camera and the multiple calibration patterns of the real object are calculated by using the coordinates of the multiple projection points transformed to the image plane of the optical see-through display from the multiple images of the calibration pattern of the real object. Extrinsic parameters between the image sensing device and the virtual camera are calculated by using the extrinsic parameters between the image sensing device and the multiple calibration patterns of the real object as well as the extrinsic parameters between the virtual camera and the multiple calibration patterns of the real object.

An embodiment of the disclosure provides a calibration system configured to calibrate the optical see-through display. The calibration system includes an image sensing device and a controller. The image sensing device is fixed at a standard position of an eye of a user seeing the optical see-through display, and the image sensing device is configured to photograph a virtual image displayed by the optical see-through display and an image of a real object in an environment. The controller is coupled to the image sensing device and the optical see-through display. The controller is configured to execute the following. A virtual calibration pattern displayed by the optical see-through display is photographed by commanding the image sensing device, and a coordinate value of an image of multiple first feature points of the virtual calibration pattern is obtained. A projection homography matrix for transforming an image plane of the image sensing device to an image plane of the optical see-through display is calculated by using the coordinate values of the image of the multiple first feature points and coordinate values of the first feature points of the virtual calibration pattern. The optical see-through display is turned off; and multiple images of a calibration pattern of a real object are photographed at different angles by using the image sensing device, and the calibration pattern of the real object has multiple second feature points. Intrinsic parameters of the image sensing device as well as extrinsic parameters between the image sensing device and multiple images of calibration patterns of the real object are calculated by using coordinates of the multiple second feature points in the multiple images of the calibration pattern of the real object and the multiple second feature points on the calibration pattern of the real object. The coordinates of the multiple second feature points in the multiple images of the calibration pattern of the real object are transformed to coordinates of projection points of the image plane of the optical see-through display by using the projection homography matrix. Intrinsic parameters of a virtual camera of the optical see-through display as well as extrinsic parameters between the virtual camera and the multiple calibration patterns of the real object are calculated by using the coordinates of the multiple projection points transformed to the image plane of the optical see-through display from the multiple images of the calibration pattern of the real object. Extrinsic parameters between the image sensing device and the virtual camera are calculated by using the extrinsic parameters between the image sensing device and the multiple calibration patterns of the real object as well as the extrinsic parameters between the virtual camera and the multiple calibration patterns of the real object.

DESCRIPTION OF THE EMBODIMENTS

Figure 1:
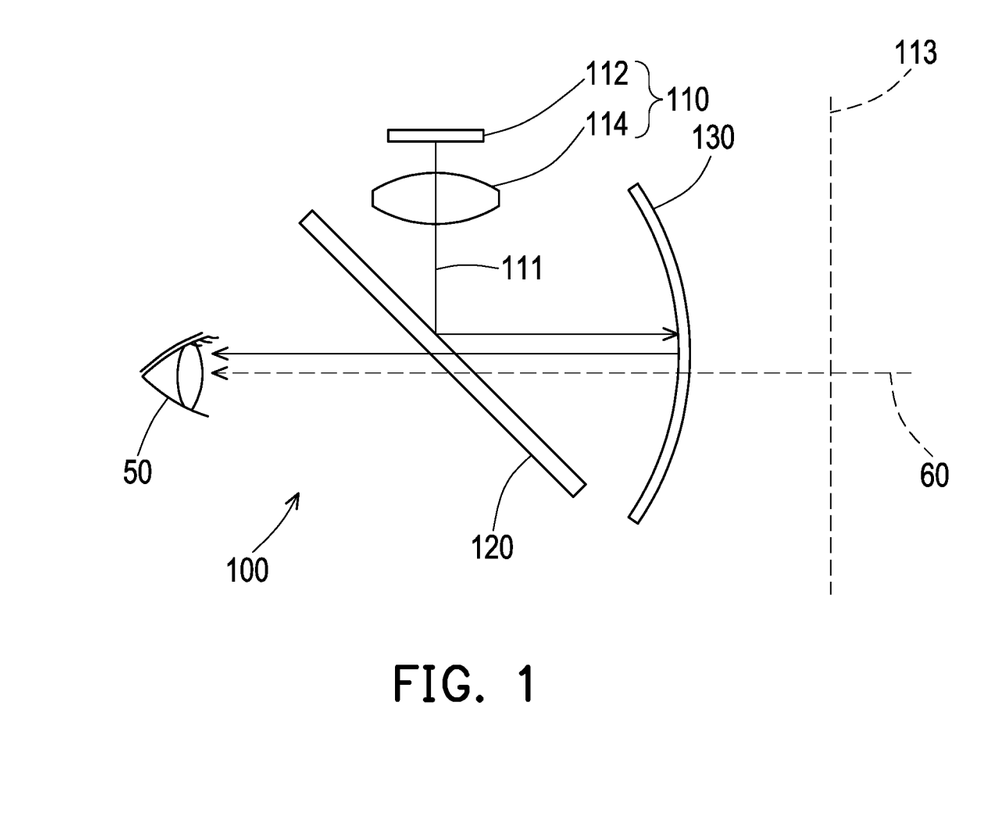
FIG. 1 is a schematic diagram of an architecture of an optical path of an optical see-through display according to an embodiment of the disclosure.
Figure 2:
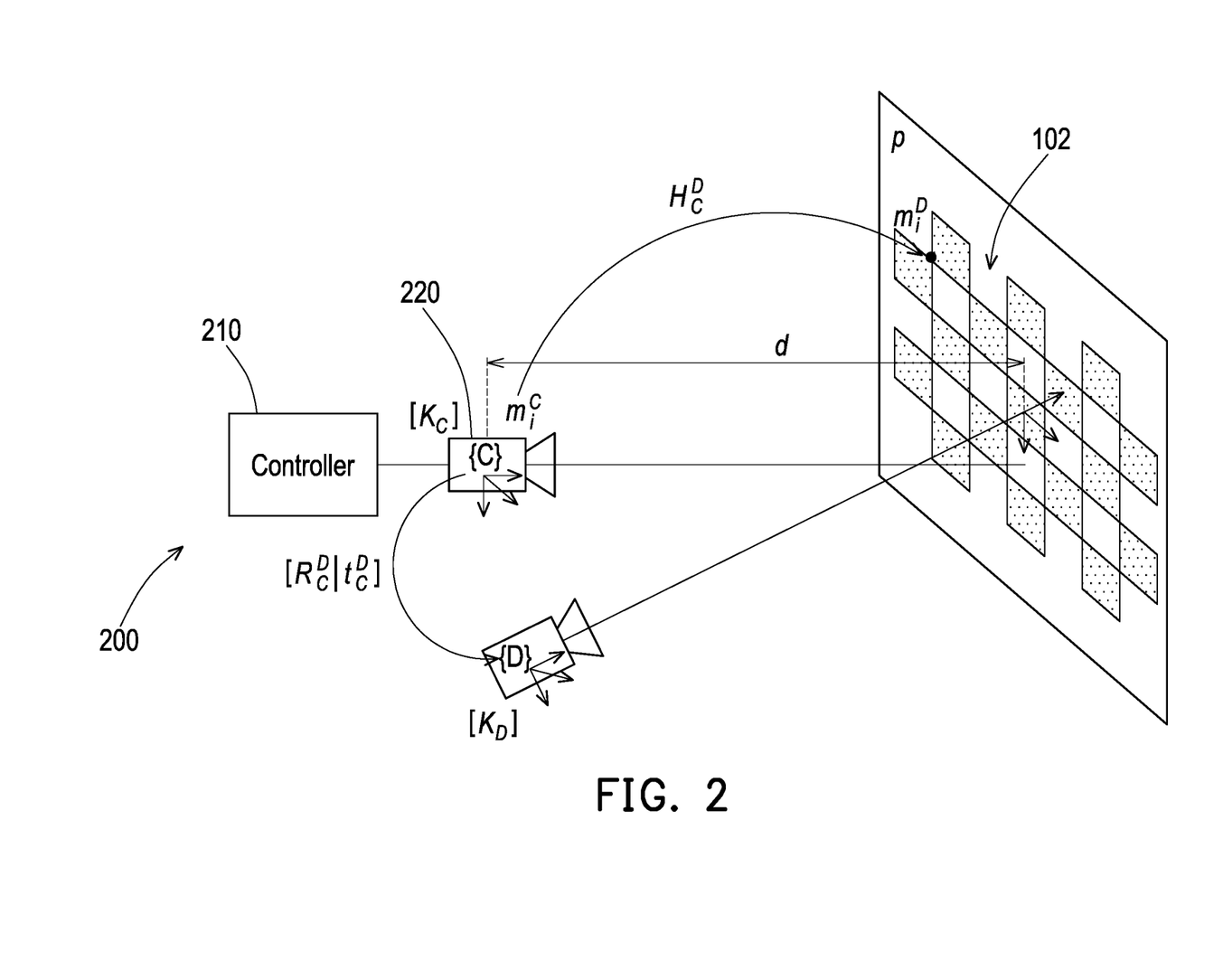
FIG. 2, FIG. 4, and FIG. 5 are schematic diagrams of an architecture of a calibration system according to an embodiment of the disclosure and are schematic diagrams illustrating a process of a calibration method for an optical see-through display according to an embodiment of the disclosure.
Figure 3:
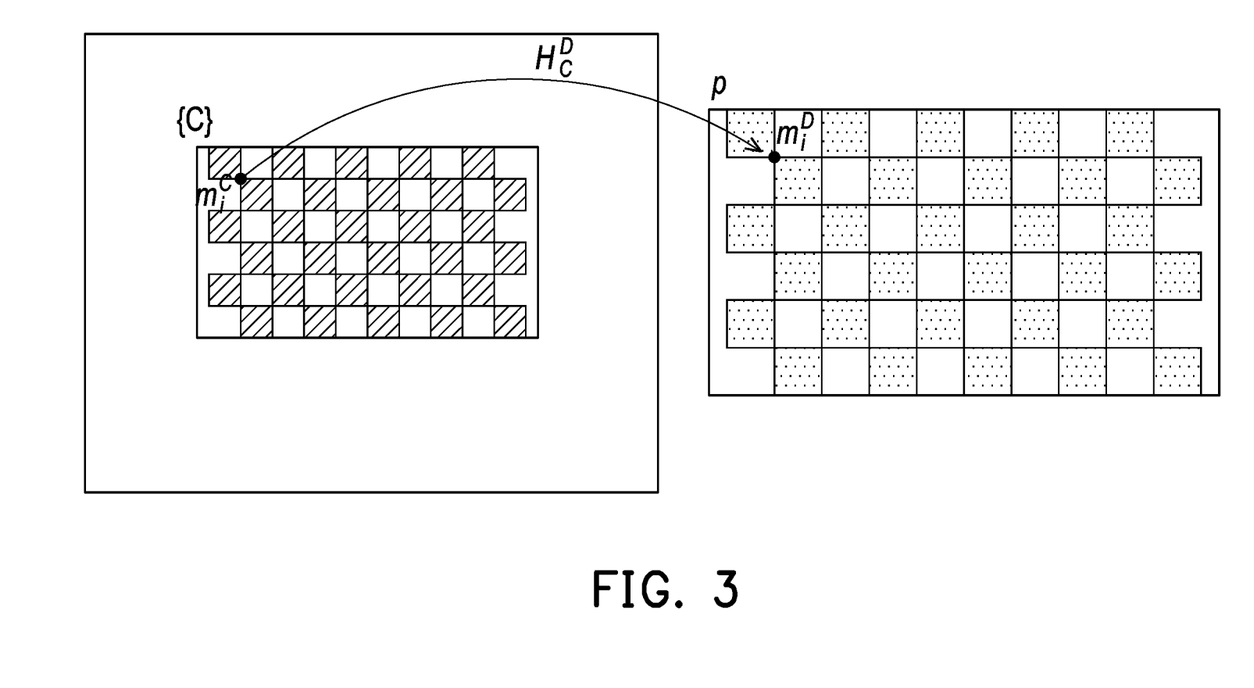
FIG. 3 is a schematic diagram of a corresponding relationship between an image photographed by an image sensing device in FIG. 2 and an image plane of an optical see-through display.
Figure 4:
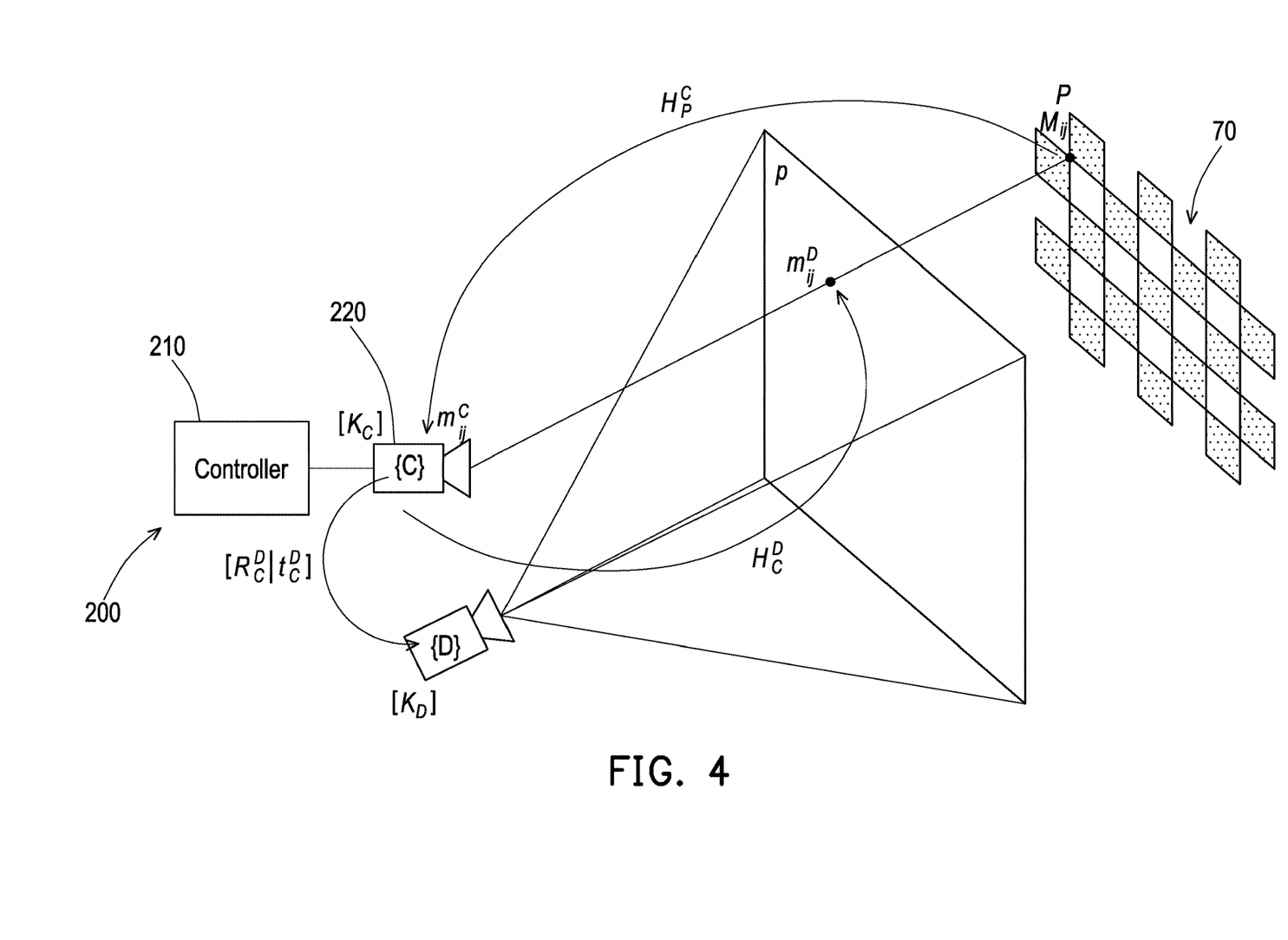
Figure 5:
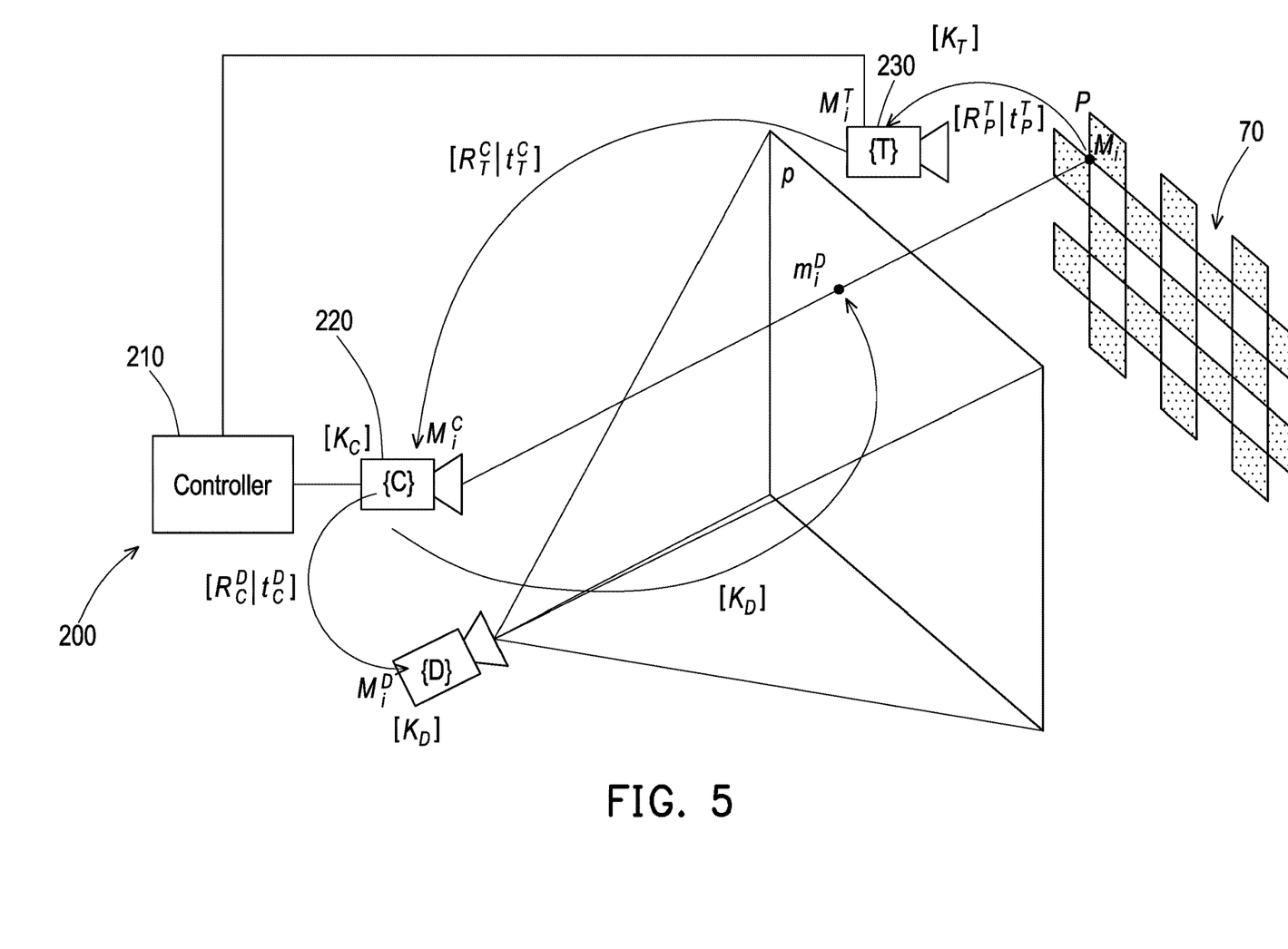

FIG. 1 is a schematic diagram of an architecture of an optical path of an optical see-through display according to an embodiment of the disclosure, and FIG. 2, FIG. 4, and FIG. 5 are schematic diagrams of an architecture of a calibration system according to an embodiment of the disclosure and are schematic diagrams illustrating a process of a calibration method for an optical see-through display according to an embodiment of the disclosure. FIG. 3 is a schematic diagram of a corresponding relationship between an image photographed by an image sensing device in FIG. 2 and an image plane of an optical see-through display. Referring to FIG. 1 to FIG. 5, a calibration system 200 (as illustrated in FIG. 2) of this embodiment is configured to calibrate an optical see-through display 100 (as illustrated in FIG. 1). The calibration system 200 includes an image sensing device 220 and a controller 210. The image sensing device 220 is fixed at a standard position of an eye 50 (as illustrated in FIG. 1) of a user seeing the optical see-through display 100. The image sensing device 220 is configured to photograph a virtual image 113 displayed by the optical see-through display 100 and an image of a real object in an environment.

The optical see-through display 100 may be various augmented reality (AR) displays. In an embodiment, the optical see-through display 100 includes a virtual image projector 110, a beam splitter 120, and a partial-see-through partial-reflective mirror 130. The virtual image projector 110 may include a display panel 112 and at least one lens 114. The display panel 112 emits an image beam 111. The display panel 112 is, for example, an organic light-emitting diode (OLED) display panel, a liquid crystal display panel, a liquid-crystal-on-silicon (LCOS) panel, a digital micro-mirror device (DMD) or other appropriate display panels. The lens 114 is disposed on a transmission path of the image beam 111. The beam splitter 120 is disposed on the transmission path of the image beam 111 from the lens 114 and reflects at least a part of the image beam 111 to the partial-see-through partial-reflective mirror 130. The beam splitter 120 may be a polarizing beam splitter (PBS) or a partial-see-through partial-reflective mirror. The partial-see-through partial-reflective mirror 130 is, for example, a semi-see-through semi-reflective curved mirror, which could reflect the part of the image beam 111 back to the beam splitter 120, and the part of the image beam 111 at least partially passes through the beam splitter 120 and is thereby transmitted to the eye 50 of the user. In this way, the eye 50 of the user sees a virtual image (i.e., the virtual image 113) in front of the partial-see-through partial-reflective mirror 130. On the other hand, a part of a light 60 from the real object in the environment sequentially passes through the partial-see-through partial-reflective mirror 130 and the beam splitter 120 and is thereby transmitted to the eye 50 of the user. In this way, the user could see the virtual image 113 and the real object in the environment at the same time, and thereby achieving an effect of mixed reality (MR) or augmented reality (AR). The optical see-through display 100 in FIG. 1 is only an example, and the disclosure does not limit the optical see-through display to adopt the architecture in FIG. 1.

The controller 210 is coupled to the image sensing device 220 and the optical see-through display 100. In this embodiment, the image sensing device 220 is, for example, a camera. A calibration method for the optical see-through display 100 of this embodiment may be executed by using the calibration system 200. The calibration method for the optical see-through display 100 includes the following. The image sensing device 220 is fixed at a standard position of the eye 50 of a user seeing the optical see-through display 100, and the image sensing device 220 is configured to photograph the virtual image 113 displayed by the optical see-through display 100 and an image of a real object in an environment. Next, the controller 210 is configured to execute the following, and the calibration method for the optical see-through display 100 in this embodiment also includes the following. First, as illustrated in FIG. 2, a virtual calibration pattern 102 displayed by the optical see-through display 100 is photographed by the image sensing device 220 commanded by the controller 210, and a coordinate value of an image of multiple first feature points of the virtual calibration pattern 102 is obtained.

For example, the image sensing device 220 may be a simulated human eye camera C, and the optical see-through display 100 could project the virtual image 113 on an image plane p of the optical see-through display, and the image plane p of the optical see-through display may be regarded as having a corresponding virtual camera D. The virtual camera D is configured to simulate the virtual image projector 110 of the optical see-through display 100. Intrinsic parameters $K_C$ of the simulated human eye camera C is obtained by pre-calibration. The next operation is to find intrinsic parameters $K_D$ of the virtual camera D and extrinsic parameters $[R_C^D|t_C^D]$ between the simulated human eye camera C and the virtual camera D, and verify the correctness thereof. In an embodiment, the intrinsic parameter $K_C$ and the intrinsic parameter $K_D$ include intrinsic parameters such as focal length and principal point, and the extrinsic parameter $[R_C^D|t_C^D]$ includes extrinsic parameters such as rotation matrix and translation vector, which are a rotation matrix transformed from the coordinate of the simulated human eye camera C to the coordinate of the virtual camera D and a translation vector, but the disclosure is not limited thereto. The intrinsic parameters in other paragraphs in this specification all include intrinsic parameters such as focal length and principal point, and the extrinsic parameters in other paragraphs in this specification all include extrinsic parameters such as rotation matrix and translation vector, but the disclosure is not limited thereto.

Firstly, referring to FIG. 2 and FIG. 3, the virtual calibration pattern 102 displayed by the image plane p of the optical see-through display is photographed by using the simulated human eye camera C. The ith first feature point in an image of the simulated human eye camera C is $m_i^C$, and the ith first feature point of the image plane p of the optical see-through display is $m_i^D$.

Next, a projection homography matrix for transforming an image plane of the image sensing device 220 to the image plane p of the optical see-through display is calculated by using the coordinate values of the image of the multiple first feature points and coordinate values of the first feature points of the virtual calibration pattern 102. In an embodiment, a method for calculating the projection homography matrix for transforming the image plane of the image sensing device 220 to the image plane p of the optical see-through display is a minimum mean-square error (MMSE) method or a random sample consensus (RANSAC) method. For example, a homography matrix $H_C^D$ from the simulated human eye camera C to the image plane p of the optical see-through display may be obtained by using the MMSE method or the RANSAC method.

Then, as illustrated in FIG. 4, the optical see-through display 100 is turned off, and multiple images of a calibration pattern 70 of the real object are photographed at different angles by using the image sensing device 220. The calibration pattern 70 of the real object has multiple second feature points. The calibration pattern 70 of the real object may be positioned on a calibration plate P of the real object.

For example, turning off the optical see-through display 100 allows the simulated human eye camera C to directly photograph the calibration plate P of the real object, and images of the calibration plate P of the real object are photographed at j different angles. The calibration plate P of the real object has the calibration pattern 70 of the real object. $M_{ij}$ is a coordinate of an ith second feature point at a jth position of the calibration plate P of the real object in the world coordinate system, and $m_{ij}^C$ is a coordinate of an ith second feature point recognized from a jth image of the calibration plate of the real object photographed by the simulated human eye camera C of an image plane of the simulated human eye camera C.

Afterward, intrinsic parameters of the image sensing device 220 as well as extrinsic parameters between the image sensing device 220 and the multiple calibration patterns 70 of the real object are calculated by using coordinates of the multiple second feature points in the multiple images of the calibration pattern 70 of the real object and the multiple second feature points on the calibration pattern 70 of the real object. In addition, the coordinates of the multiple second feature points in the multiple images of the calibration pattern 70 of the real object are transformed to coordinates of projection points of the image plane p of the optical see-through display by using the projection homography matrix. For example, $m_{ij}^C$ is transformed to a coordinate $m_{ij}^D$ of an image plane of the virtual camera D by using the homography matrix $H_C^D$ ($m_{ij}^D = H_C^D m_{ij}^C$).

In addition, intrinsic parameters of the virtual camera D of the optical see-through display 100 as well as extrinsic parameters between the virtual camera D and the multiple calibration patterns 70 of the real object are calculated by using the coordinates of the multiple projection points transformed to the image plane p of the optical see-through display from the multiple images of the calibration pattern 70 of the real object. Furthermore, extrinsic parameters between the image sensing device 220 and the virtual camera D are calculated by using the extrinsic parameters between the image sensing device 220 and the multiple calibration patterns 70 of the real object as well as the extrinsic parameters between the virtual camera D and the multiple calibration patterns 70 of the real object. In an embodiment, a method for calculating the extrinsic parameters between the image sensing device 220 and the virtual camera D includes Zhang Zhengyou's camera calibration algorithm.

For example, Zhang Zhengyou's camera calibration algorithm may be used (refer to the paper: "Zhang, Zhengyou, "A flexible new technique for camera calibration." IEEE Transactions on pattern analysis and machine intelligence 22.11 (2000): 1330-1334"), the intrinsic parameters $K_D$ of the virtual camera D and the extrinsic parameters $[R_C^D | t_C^D]$ between the simulated human eye camera C and the virtual camera D may be estimated by $M_{ij}$, $m_{ij}^C$, and $m_{ij}^D$.

Specifically, regarding the derivation of Zhang Zhengyou's camera calibration algorithm, please refer to FIG. 4. $K_D(3\times3)$ is the intrinsic parameters of the virtual camera D (where 3×3 represents that $K_D$ is a 3×3 matrix), and $R_P^D$ (3×3) and $t_P^D$(3×1) are the rotation matrix and the translation vector for transforming a coordinate system of the calibration plate P of the real object to a coordinate system of the virtual camera D (where 3×1 represents that $t_P^D$ is a 3×1 matrix, that is, a vector). According to the pinhole camera model and a matrix operation for transforming coordinate systems, a transformation relationship between the coordinate system of the calibration plate P of the real object and the coordinate system of the virtual camera D may be expressed as formula (1):

$$\begin{bmatrix} u \\ v \\ 1 \end{bmatrix} = \lambda [K_D \ 0] \begin{bmatrix} R_P^D & t_P^D \\ 0^T & 1 \end{bmatrix} \begin{bmatrix} x_P \\ y_P \\ z_P \\ 1 \end{bmatrix} \quad (1)$$

$[x_P \ y_P \ z_P \ 1]^T$ is a homogeneous coordinate of one of the feature points on a plane of the calibration pattern 70 of the real object of the calibration plate P of the real object, and $[u \ v \ 1]^T$ is a homogeneous coordinate of the feature point projected to the image plane of the virtual camera D. Since the calibration pattern 70 of the real object is a plane, $z_P = 0$. Therefore, a homography matrix H transformed from the coordinate system of the calibration pattern 70 of the real object of the calibration plate P of the real object to the coordinate system of the image plane of the virtual camera D may be simplified as formula (2):

$$\begin{bmatrix} x_D \\ y_D \\ z_D \\ 1 \end{bmatrix} = \begin{bmatrix} R_P^D & t_P^D \\ 0^T & 1 \end{bmatrix} \begin{bmatrix} x_P \\ y_P \\ z_P \\ 1 \end{bmatrix} = [r_1 \ r_2 \ r_3 \ t] \begin{bmatrix} x_P \\ y_P \\ 0 \\ 1 \end{bmatrix} = [r_1 \ r_2 \ t] \begin{bmatrix} x_P \\ y_P \\ 1 \end{bmatrix} \quad (2)$$

$$H = \lambda [K_D \ 0] \begin{bmatrix} R_P^D & t_P^D \\ 0^T & 1 \end{bmatrix} = \lambda [r_1 \ r_2 \ t]$$

Order $H = [h_1 \ h_2 \ h_3]$, formula (2) may be rewritten as:

$$[h_1 h_2 h_3] = \lambda K_D [r_1 r_2 t] \quad (3)$$

By characteristics of the rotation matrix, each column of the rotation matrix is orthogonal to each other and the modulus is 1 (i.e., orthonormal), and formula (4) and formula (5) may be derived:

$$h_1^T K_D^{-T} K_D^{-1} h_2 = 0 \quad (4)$$

$$h_1^T K_D^{-T} K_D^{-1} h_1 = h_2^T K_D^{-T} K_D^{-1} h_2 \quad (5)$$

The homography matrix H may be obtained from $H_P^C$ and $H_C^D$:

$$[h_1 h_2 h_3] = H = H_C^D H_P^C \quad (6)$$

$H_P^C$ is a homography matrix from the calibration plate P of the real object to the simulated human eye camera C.

Through formula (4), formula (5), and formula (6), the intrinsic parameters $K_D$ of the virtual camera D may be obtained by using Zhang Zhengyou's camera calibration algorithm, and the extrinsic parameters $[R_P^D|t_P^D]$ between the virtual camera D and the calibration pattern 70 of the real object may be obtained by inserting $K_D$ to formula (3), and along with the extrinsic parameters $[R_P^C|t_P^C]$ between the simulated human eye camera C and the calibration pattern 70 of the real object obtained by using the pose estimation algorithm, the extrinsic parameters $[R_C^D|t_C^D]$ between the simulated human eye camera C and the virtual camera D may be derived.

Referring to FIG. 5, in an embodiment, the calibration system 200 further includes a tracking camera 230 coupled to the controller 210, and the controller 210 further executes the following. Firstly, a pattern (such as the calibration pattern 70 of the real object) of a real object of a known size is photographed by commanding the tracking camera 230, and extrinsic parameters between the tracking camera 230 and the pattern (such as the calibration pattern 70 of the real object) of the real object is obtained. A relation between the tracking camera 230 and the image sensing device 220 is calibrated, and intrinsic parameters of the tracking camera 230 as well as extrinsic parameters between the tracking camera 230 and the image sensing device 220 are obtained. Then, a coordinate of a third feature point on the pattern (such as the calibration pattern 70 of the real object) of the real object is transformed to a coordinate of an image photographed by the tracking camera 230, then transformed to a coordinate of an image photographed by the image sensing device 220, and further transformed to a coordinate of an image of the virtual camera D, and lastly transformed to a coordinate of a virtual image (i.e., the virtual image 113 of the image plane p of the optical see-through display) displayed by the optical see-through display 100; and a position represented thereof, the third feature point, and the standard position (i.e., the standard position of the eye 50 seeing the optical see-through display 100, that is, the standard position where the image sensing device 220 is disposed) are on the same straight line in a space, so as to achieve an effect of a fusion of the virtual image 113 and a real object in an environment. In an embodiment, a method for obtaining the extrinsic parameters between the tracking camera 230 and the pattern (such as the calibration pattern 70 of the real object) of the real object is a pose estimation algorithm.

For example, in a scene where real objects need to be detected for a fusion of virtual images and the real objects, the tracking camera 230 may be added and marked as a tracking camera T herein. Under a premise that the tracking camera T and the simulated human eye camera C jointly complete a camera calibration procedure, and intrinsic parameters $K_T$ of the tracking camera T, intrinsic parameters $K_C$ of the simulated human eye camera C, and extrinsic parameters $[R_T^C|t_T^C]$ of both are known, then when photographing the pattern (such as the calibration pattern 70 of the real object of the calibration plate P of the real object) of the real object of the known size, the tracking camera T could obtain extrinsic parameters $[R_P^T|t_P^T]$ between the two by using the pose estimation algorithm. A coordinate $M_i$ of an ith third feature point on the real object (such as the calibration plate P of the real object) is transformed to $M_i^T$ of a coordinate system {T} of the tracking camera; then $M_i^T$ is transformed to $M_i^C$ of a coordinate system {C} of the simulated human eye camera by using extrinsic parameters $[R_T^C|t_T^C]$ and further $M_i^C$ is transformed to $M_i^D$ of a coordinate system {D} of the virtual camera by using extrinsic parameters $[R_C^D|t_C^D]$, and lastly $M_i^D$ is projected to a virtual image plane (i.e., the image plane p of the optical see-through display) as $m_i^D$ by using the intrinsic parameters $K_D$ of the virtual camera D obtained in the previous operation. $m_i^D$ is a visual coincidence point with $M_i$ when the simulated human eye camera C is at a current position. The relational formulas of the above transformations are as the following formula (7) and formula (8):

$$M_i^T = [R_P^T | t_P^T] M_i \quad (7)$$

$$m_i^D = K_D [R_C^D | t_C^D][R_T^C | t_T^C] M_i^T \quad (8)$$

Figure 6:
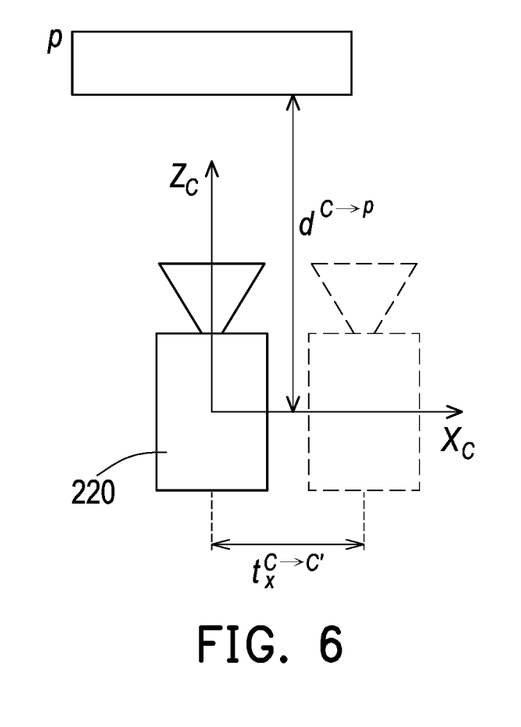
FIG. 6 is a schematic diagram of an adjustment method of an optical see-through display in FIG. 1 when an eye distance of a user changes.

Next, referring to FIG. 6, the controller 210 further executes the following. A translation amount corresponding to a change of an eye distance is created to the extrinsic parameters between the image sensing device 220 and the virtual camera D in response to the change of the eye distance (i.e., an interpupillary distance) of the user, and a position of the virtual image 113 displayed by the optical see-through display 100 is calculated according to the extrinsic parameters after the translation amount is created. In an embodiment, a direction of the translation amount is parallel to a direction of a line connecting the two eyes of the user.

For example, when a setting of the eye distance is changed, by using the position of the simulated human eye camera C during the calibration as a reference, after the eye distance is changed, it is equivalent to the simulated human eye camera C moving $$t_x^{C \to C'}$$

on the $X_C$ axis. At this time, $m_i^D$ of the simulated human eye camera at a C' position may be calculated by simply amending the extrinsic parameters $[R_C^D|t_C^D]$ between the simulated human eye camera C and the virtual camera D as $$[R_C^D | t_C^D + t_x^{C \to C'}]$$

and applying to formula (8). In this way, the virtual image 113 displayed by the optical see-through display 100 may be adaptively adjusted according to different eye distances, so as to ensure the accuracy of the fusion of the virtual images and the real objects. In this embodiment, the $X_C$ axis is, for example, parallel to a direction of the line connecting the two eyes of the user; the $Z_C$ axis is, for example, perpendicular to the image plane p of the optical see-through display; and $d^{C \to p}$ is, for example, a distance from the simulated human eye camera C to the image plane p of the optical see-through display, that is, a distance d in FIG. 2.

In the calibration method for the optical see-through display 100 and the calibration system 200 of this embodiment, since the extrinsic parameters between the image sensing device 220 and the virtual camera D may be calculated by using the above calibration operations, the optical see-through display 100 could generate an optimized fusion of the virtual images and the real objects suitable for the eye distance according to pre-written extrinsic parameters and the setting of the eye distance after leaving the factory. In this way, the optical see-through display 100 may be applied to users with different eye distances, and the users with different eye distances could see a good fusion of virtual images and real objects.

Figure 7:
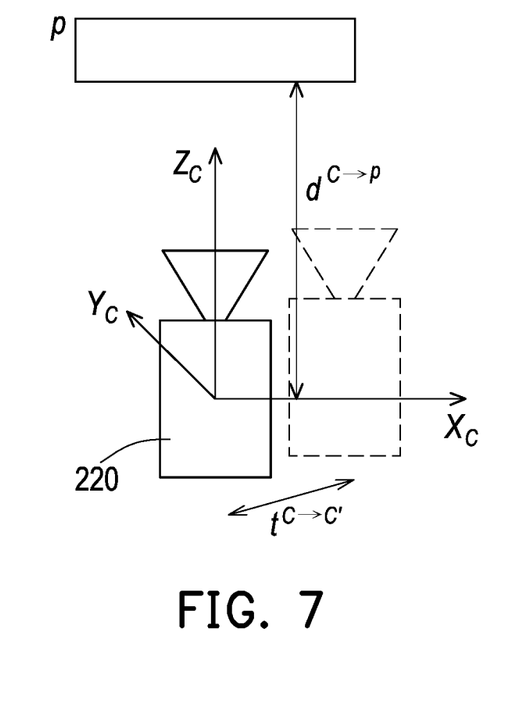
FIG. 7 is a schematic diagram of an adjustment method of an optical see-through display in FIG. 1 when a position of an eye of a user changes.

In another embodiment, as illustrated in FIG. 7, the direction of the translation amount is inclined with respect to the direction of the line connecting the two eyes of the user. For example, when a position of an eye is changed, by using the position of the simulated human eye camera C during the calibration as a reference, after the position of the eye is changed, it is equivalent to the simulated human eye camera C moving $$t^{C \to C'}$$

on a plane (or in a space formed by the $X_C$ axis, the $Y_C$ axis, and the $Z_C$ axis) formed by the $X_C$ axis and the $Z_C$ axis. At this time, $m_i^D$ of the simulated human eye camera at a C' position may be calculated by simply amending the extrinsic parameters $[R_C^D | t_C^D]$ between the simulated human eye camera C and the virtual camera D as $$[R_C^D | t_C^D + t^{C \to C'}]$$

and applying to formula (8). In this way, the virtual image 113 displayed by the optical see-through display 100 may be adaptively adjusted according to different positions of the eyes, so as to ensure the accuracy of the fusion of the virtual images and the real objects. In this embodiment, the $X_C$ axis is, for example, parallel to the direction of the line connecting the two eyes of the user; the $Z_C$ axis is, for example, perpendicular to the image plane p of the optical see-through display; the $Y_C$ axis is, for example, perpendicular to the $X_C$ axis and the $Z_C$ axis; and $d^{C \to p}$ is, for example, a distance from the simulated human eye camera C to the image plane p of the optical see-through display.

In an embodiment, the controller 210 is, for example, a central processing unit (CPU), a microprocessor, a digital signal processor (DSP), a programmable controller, and a programmable logic device (PLD) or other similar devices or a combination of these devices, and the disclosure is not limited thereto. In addition, in an embodiment, each function of the controller 210 may be implemented as multiple program codes. These program codes are stored in a memory, and these program codes are executed by the controller 210. Alternatively, in an embodiment, each function of the controller 210 may be implemented as one or multiple circuits. The disclosure does not limit the implementation of the functions of the controller 210 by means of software or hardware.

In addition, the parameters calibrated in FIG. 2 to FIG. 4 or FIG. 2 to FIG. 5 may be stored in a storage medium of the optical see-through display 100. The storage medium is, for example, a flash memory, a solid state hard disk, a magnetic disk, an optical disk or various storage media. In this way, after the optical see-through display 100 leaving the factory, parameters in the storage medium may be read by using a controller of the optical see-through display 100 or other external controllers connected thereto according to the needs of users to execute the operations illustrated in FIG. 6 or in FIG. 7, so as to generate an optimized fusion of virtual images and real objects according to different eye distance settings of the user.

In summary, in the calibration method for the optical see-through display and the calibration system according to the embodiment of the disclosure, since the extrinsic parameters between the image sensing device and the virtual camera could be calculated by using the above calibration operations, the optical see-through display could generate the optimized fusion of the virtual images and the real objects suitable for the eye distance according to the pre-written extrinsic parameters and the setting of the eye distance after leaving the factory.

What is claimed is:

1. A calibration method for an optical see-through display, comprising:

fixing an image sensing device at a standard position of an eye of a user seeing the optical see-through display, wherein the image sensing device is configured to photograph a virtual image displayed by the optical see-through display and an image of a real object in an environment;

photographing a virtual calibration pattern displayed by the optical see-through display by using the image sensing device, and obtaining a coordinate value of an image of a plurality of first feature points of the virtual calibration pattern;

calculating a projection homography matrix for transforming an image plane of the image sensing device to an image plane of the optical see-through display by using the coordinate values of the image of the plurality of first feature points and coordinate values of the first feature points of the virtual calibration pattern;

turning off the optical see-through display and photographing a plurality of images of a calibration pattern of the real object at different angles by using the image sensing device, wherein the calibration pattern of the real object has a plurality of second feature points;

calculating intrinsic parameters of the image sensing device and extrinsic parameters between the image sensing device and the plurality of images of calibration patterns of the real object by using coordinates of the plurality of second feature points in the plurality of images of the calibration pattern of the real object and the plurality of second feature points on the calibration pattern of the real object;

transforming the coordinates of the plurality of second feature points in the plurality of images of the calibration pattern of the real object to coordinates of a plurality of projection points of the image plane of the optical see-through display by using the projection homography matrix;

calculating intrinsic parameters of a virtual camera of the optical see-through display and extrinsic parameters between the virtual camera and the plurality of calibration patterns of the real object by using the coordinates of the plurality of projection points transformed to the image plane of the optical see-through display from the plurality of images of the calibration pattern of the real object; and calculating extrinsic parameters between the image sensing device and the virtual camera by using extrinsic parameters between the image sensing device and the plurality of calibration patterns of the real object and the extrinsic parameters between the virtual camera and the plurality of calibration patterns of the real object.

2. The calibration method for the optical see-through display as claimed in claim 1, wherein the virtual camera is configured to simulate a virtual image projector of the optical see-through display.

3. The calibration method for the optical see-through display as claimed in claim 1, wherein a method for calculating the projection homography matrix for transforming the image plane of the image sensing device to the image plane of the optical see-through display is a minimum mean-square error (MMSE) method or a random sample consensus (RANSAC) method.

4. The calibration method for the optical see-through display as claimed in claim 1, further comprising:

photographing a pattern of the real object of a known size by using a tracking camera and obtaining extrinsic parameters between the tracking camera and the pattern of the real object, wherein a relation between the tracking camera and the image sensing device is calibrated, and obtaining intrinsic parameters of the tracking camera and extrinsic parameters between the tracking camera and the image sensing device; and transforming a coordinate of a third feature point on the pattern of the real object to a coordinate of an image photographed by the tracking camera, then transforming to a coordinate of an image photographed by the image sensing device, and further transforming to a coordinate of an image of the virtual camera, and lastly transforming to a coordinate of the virtual image displayed by the optical see-through display, wherein a position represented by the coordinate of the virtual image, the third feature point, and the standard position are on a same straight line in a space.

5. The calibration method for the optical see-through display as claimed in claim 4, wherein a method for obtaining the extrinsic parameters between the tracking camera and the pattern of the real object is a pose estimation algorithm.

6. The calibration method for the optical see-through display as claimed in claim 1, further comprising:

creating a translation amount corresponding to a change of an eye distance to the extrinsic parameters between the image sensing device and the virtual camera in response to the change of the eye distance of the user, and calculating a position of the virtual image displayed by the optical see-through display according to the extrinsic parameters after the translation amount is created.

7. The calibration method for the optical see-through display as claimed in claim 6, wherein a direction of the translation amount is parallel to a direction of a line connecting the two eyes of the user.

8. The calibration method for the optical see-through display as claimed in claim 6, wherein a direction of the translation amount is inclined with respect to a direction of a line connecting the two eyes of the user.

9. The calibration method for the optical see-through display as claimed in claim 1, wherein a method for calculating the extrinsic parameters between the image sensing device and the virtual camera comprises Zhang Zhengyou's camera calibration algorithm.

10. A calibration system configured to calibrate an optical see-through display, wherein the calibration system comprises:

an image sensing device, fixed at a standard position of an eye of a user seeing the optical see-through display, wherein the image sensing device is configured to photograph a virtual image displayed by the optical see-through display and an image of a real object in an environment; and a controller, coupled to the image sensing device and the optical see-through display, wherein the controller is configured to:

photograph a virtual calibration pattern displayed by the optical see-through display by commanding the image sensing device, and obtain a coordinate value of an image of a plurality of first feature points of the virtual calibration pattern;

calculate a projection homography matrix for transforming an image plane of the image sensing device to an image plane of the optical see-through display by using the coordinate values of the image of the plurality of first feature points and coordinate values of the first feature points of the virtual calibration pattern;

turn off the optical see-through display and photograph a plurality of images of a calibration pattern of the real object at different angles by using the image sensing device, wherein the calibration pattern of the real object comprises a plurality of second feature points;

calculate intrinsic parameters of the image sensing device and extrinsic parameters between the image sensing device and the plurality of calibration patterns of the real object by using coordinates of the plurality of second feature points in the plurality of images of the calibration pattern of the real object and the plurality of second feature points on the calibration pattern of the real object;

transform the coordinates of the plurality of second feature points in the plurality of images of the calibration pattern of the real object to coordinates of projection points of the image plane of the optical see-through display by using the projection homography matrix;

calculate intrinsic parameters of a virtual camera of the optical see-through display and extrinsic parameters between the virtual camera and the plurality of calibrations patterns of the real object by using the coordinates of the plurality of projection points transformed to the image plane of the optical see-through display from the plurality of images of the calibration pattern of the real object; and calculate extrinsic parameters between the image sensing device and the virtual camera by using the extrinsic parameters between the image sensing device and the plurality of calibration patterns of the real object and the extrinsic parameters between the virtual camera and the plurality of calibration patterns of the real object.

11. The calibration system as claimed in claim 10, wherein the virtual camera is configured to simulate a virtual image projector of the optical see-through display.

12. The calibration system as claimed in claim 10, wherein a method for calculating the projection homography matrix for transforming the image plane of the image sensing device to the image plane of the optical see-through display is a minimum mean-square error (MMSE) method or a random sample consensus (RANSAC) method.

13. The calibration system as claimed in claim 10, further comprising a tracking camera coupled to a controller, wherein the controller is further configured to:
   photograph a pattern of the real object of a known size by commanding the tracking camera, and obtain extrinsic parameters between the tracking camera and the pattern of the real object, wherein a relation between the tracking camera and the image sensing device is calibrated, and obtain intrinsic parameters of the tracking camera and extrinsic parameters between the tracking camera and the image sensing device; and
   transform a coordinate of a third feature point on the pattern of the real object to a coordinate of an image photographed by the tracking camera, then transform to a coordinate of an image photographed by the image sensing device, and further transform to a coordinate of an image of the virtual camera, and lastly transform to a coordinate of a virtual image displayed by the optical see-through display, wherein a position represented by the coordinate of the virtual image, the third feature point, and the standard position are on a same straight line in a space.

14. The calibration system as claimed in claim 13, wherein a method for obtaining the extrinsic parameters between the tracking camera and the pattern of the real object is a pose estimation algorithm.

15. The calibration system as claimed in claim 10, wherein the controller is further configured to:
   create a translation amount corresponding to a change of an eye distance to the extrinsic parameters between the image sensing device and the virtual camera in response to the change of the eye distance of the user, and calculate a position of the virtual image displayed by the optical see-through display according to the extrinsic parameters after the translation amount is created.

16. The calibration system as claimed in claim 15, wherein a direction of the translation amount is parallel to a direction of a line connecting the two eyes of the user.

17. The calibration system as claimed in claim 15, wherein a direction of the translation amount is inclined with respect to a direction of a line connecting the two eyes of the user.

18. The calibration system as claimed in claim 10, wherein a method for calculating the extrinsic parameters between the image sensing device and the virtual camera comprises Zhang Zhengyou's camera calibration algorithm.

* * * * *